United States Patent

[11] 3,539,101

[72] Inventor Jakob Huber
 Wuerenlos, Switzerland
[21] Appl. No. 749,011
[22] Filed July 31, 1968
[45] Patented Nov. 10, 1970
[73] Assignee J. Huber & Cie. AG
 Wuerenlos, Switzerland
 a corporation of Switzerland

[54] CONTROL ARRANGEMENT FOR VALVES
 10 Claims, 3 Drawing Figs.
[52] U.S. Cl....................................................... 236/99,
  251/14, 251/250
[51] Int. Cl.............................................. G05d 23/12
[50] Field of Search............................................ 236/42, 68,
  99; 251/250X, 14X

[56] References Cited
 UNITED STATES PATENTS
2,256,319 9/1941 Johnson ........................ 251/250X
3,207,438 9/1965 Huber ............................ 251/250X
3,253,610 5/1966 Pahl et al. ...................... 251/14X
3,263,924 8/1966 Kolze ............................ 236/99X
1,873,769 8/1932 Lang ............................. 236/12
1,916,814 7/1933 Shivers ......................... 236/99X
3,112,879 12/1963 Killias.......................... 236/12

Primary Examiner—William E. Wayner
Attorney—Kenyon, and Kenyon, Reilly, Carr and Chapin ABSTRACT: This application discloses a control arrangement for valves regulating the flow of a heating fluid, for example, the flow of hot water in a hot water room heating system. The arrangement comprises a temperature sensor converting the sensed temperature to fluid pressure, the latter actuating a bellows whereto a ram means is connected via a spring. The ram means is placed inside a tubular actuating member and abuts against one closed end thereof. The actuating member is urged by a second spring having one end abutting against the inside of a stationary housing for the control arrangement, against the action of the first mentioned spring for axially moving the tubular actuating member, depending on the relative tension of the springs. The length of the ram means is adjustable for influencing the action of the first mentioned spring. The tubular actuating member has a portion provided with a rack whose teeth are engaged with the teeth of a pinion mounted on a shaft for operating the valve regulating the flow of the heating fluid, the shaft being turned when the actuating member moves in the axial direction.

Patented Nov. 10, 1970
3,539,101
Sheet 1 of 2
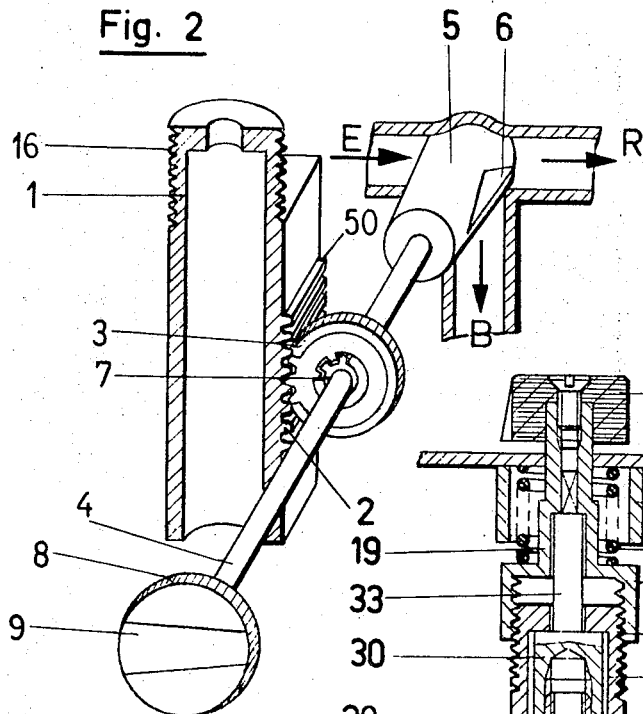
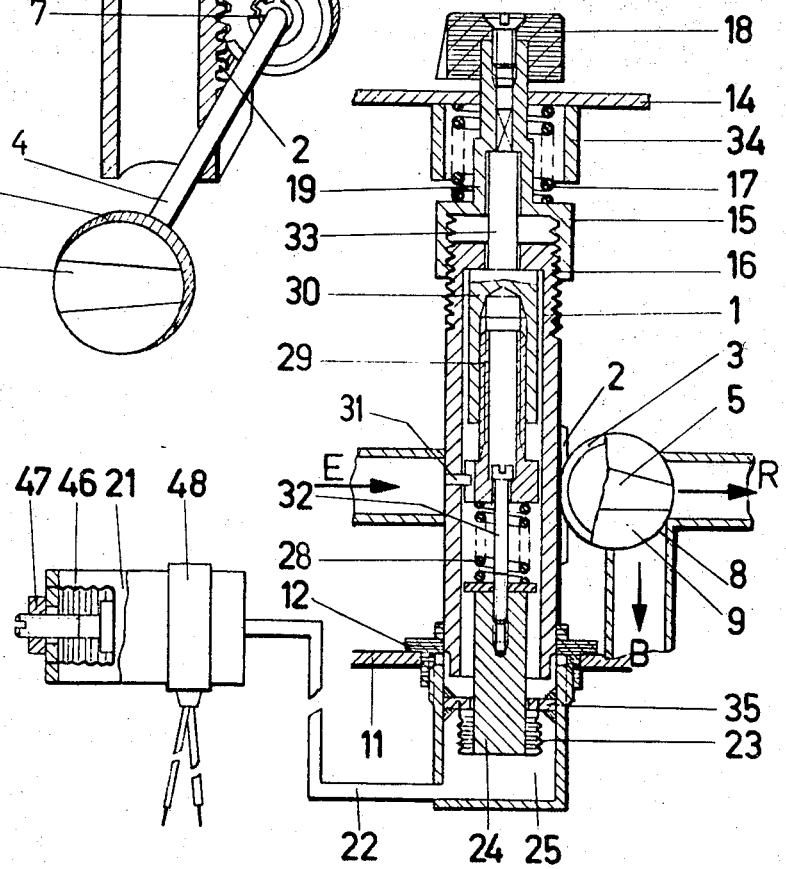
INVENTOR
JAKOB HUBER
BY Kenyon & Kenyon
ATTORNEYS Patented Nov. 10, 1970
3,539,101
Sheet 2 of 2
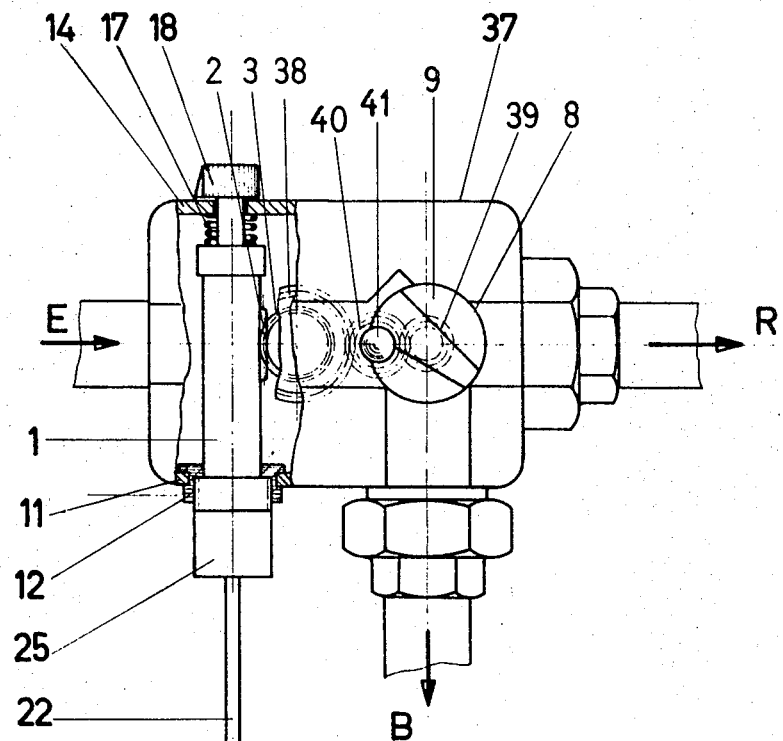
Fig. 3
INVENTOR
JAKOB HUBER
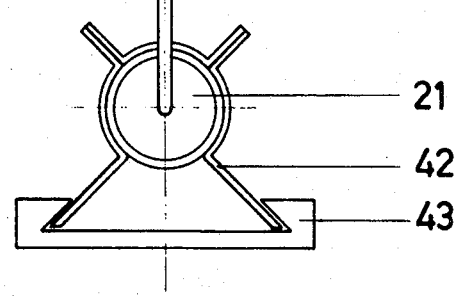
ATTORNEY

CONTROL ARRANGEMENT FOR VALVES

The present invention relates to valve control means for regulating the flow of a heating medium in space heating installations, said control means having an actuating member for actuating a valve and a thermal element for controlling the operation of said actuating member.

In water heating installations radiator valves are provided which are operated by a rotary cock to permit the delivery or disconnection of the heating water. These valves which operate as ordinary water cocks have previously proved satisfactory, as most heating installations operated on the gravity principle. In such installations, the hot water rises in a riser, is cooled through the radiator and then, being heavier in weight, returns to the furnace by gravity.

Modern heating installations no longer operate on the gravity principle but have a circulation pump. The advantage of these modern systems is that the ducts or conduits through which the heating medium is circulated can be arranged without consideration of the physical requirements of gravity circulation, and also in smaller dimensions than is possible in gravity heating systems. However, the pressure rise in the duct or conduit system has the disadvantage that the adjustment of the radiators is made difficult. The smallest, difficult to adjust, opening of a valve is sufficient to let through so much water that the radiator assumes the full water temperature of the feed duct or conduit.

Automatically operated valves are known, for example valves which are controlled by an electrical room thermostat, wherein the valves are opened and closed by means of a small synchronous motor. Valves are also known which effect a partial closing of the flow area of the valve by means of an expansion fluid or by means of an expansion material such as rubber. However, even these valves have the disadvantage that a regulation is achieved only at great temperature fluctuations or only an insufficient regulation is obtained so that a constant readjustment is necessary for changes in boiler and outside temperature. Systems having electromagnetic means such as electrical room thermostats, electric motors, magnets, which means permit a linear movement, are to expensive to be considered for domestic purposes.

When the room temperature is to be maintained within limits, for example of ± 1°C., and as well as at fluctuating boiler temperature, the slide valve must be fully opened or closed within this temperature range.

It is an object of the present invention to provide a temperature regulating valve for hot water heating plants whereby the problem outlined in the paragraph next above is solved.

The regulating valve according to the invention comprises a regulating element operating as a plunger to act as a valve actuating member and arranged between two springs of different elasticity constants, one of said springs resting on a stationary support, the second spring floating on the pressurized heating fluid, the length of the regulating element being adjustable for obtaining a floating position of the valve actuating member at any position pressure.

The features which are considered characteristic of the invention are set forth with particularity in the appended claims. The invention itself, however, and additional objects and advantages thereof will best be understood from the following description of embodiments thereof when read in connection with the accompanying drawing, wherein:

FIG. 1 is a diagrammatic part sectional elevation of valve control means according to the invention;

FIG. 2 is a diagrammatic part sectional and part perspective illustration of the flow control valve; and FIG. 3 is a part sectional elevation of a modified valve control means arranged in a housing.

Referring to FIGS. 1 and 2, a rack 2 provided on a cylindrical tube 1 is engaged by a pinion 3 to which a rotary movement is imparted by an axial movement of the tube 1. The pinion 3 is mounted on a shaft 4 to which is connected a rotary valve body 5. In the example illustrated the rotary valve body 5 is constructed as a three-way cock which, in one of its limit positions, conducts heating fluid from a pipe E, connected to a water heater, to a pipe R, connected to a radiator, and in the second limit position conducts fluid to a bypass pipe B.

A hand wheel 8 is mounted on one end of the shaft 4 for permitting manual adjustment of the rotary valve body 5. In order to permit such adjustment independently of the tube 1 and the pinion 3 a gear-type clutch 7 is provided between the pinion 3 and the shaft 4 whereby the pinion 3 can be moved out of operative connection with the rack 2. The hand wheel 8 is provided with an indicator disc 9 by which the angular position of the rotary valve body 5 can be seen at all times.

The tube 1, acting as an actuating member for the rotary valve body 5, is mounted between two fixed parts 11 and 14 of a housing and is slidably mounted in the part 11 of the housing. A first spring 17, in the embodiment illustrated a compression spring, is arranged between a screw sleeve 15 screwed onto the upper end of the tube 1 and the fixed part 14 of the housing. The sleeve 15 is internally screw-threaded and screws onto external screw threads 16 of the tube 1 and is rotatable thereon. Furthermore, the threaded sleeve 15 is provided with an axial extension or boss 19 on which is fixed a hand adjusting knob 18. Rotation of the tube 1 is prevented by means, such as, the use of elongated teeth 50 on a rectangular cross-sectional portion of the tube 1 so that by rotating the adjusting knob 18, and thereby also the sleeve 15, the tube 1 can be moved up and down to effect axial adjustment thereof.

For controlling the axial movement of the tube 1 and with it the rotary valve body 5 a conventional temperature feeler 21 is provided in known manner wherein, for example, a fluid, under the influence of the ambient temperature, changes in volume and thereby produces a working pressure variable with said temperature. The temperature feeler 21 is connected to the valve control by means of a capillary tube 22 which terminates in a chamber 25 connected to the fixed part 11 of the housing and which is closed by means of a sealing ring 35 fixed to the chamber 25. A working bellows 23 on which the fluid pressure generated in the temperature feeler 21 acts, is connected to the sealing ring 35. The free end of the working bellows 23 is provided with an axial pin 24 which extends through the sealing ring 35 and projects into the interior of the tube 1. A second compression spring 28 is arranged between the pin 24 and an adjusting member consisting of a screw-threaded bolt 29 screwed into a screw-threaded sleeve or ram 30 located within said tube 1 and coaxial therewith. The threaded ram 30 is pressed against a collar of the upper end of the tube 1 by means of the spring 28. The threaded bolt 29 and the threaded sleeve or ram 30 are provided with steep pitch threads. In addition, the threaded sleeve or ram 30 is provided with an arbor 33, which is arranged concentrically in the extension or boss 19 of the threaded sleeve 15 and terminates in a square end part extending into a square hole in the boss 19. Consequently, by rotating the adjusting knob 18 the threaded sleeve or ram 30 is likewise rotated. The threaded bolt 29 is secured against rotation by a pin 31 which engages in a longitudinal groove in the foot of said bolt so that rotation of the adjustment knob 18 effects an axial movement of the threaded bolt 29 and with it a varying force created by the spring 28. The pin 24 connected to the inside of the working bellows 23 is connected to the threaded bolt 29 by means of a screw 32, whose shank is slidingly arranged in an axial bore in the threaded bolt 29.

Operation of the aforedescribed control means is as follows:

In the position illustrated in FIG. 1, the tube 1 which actuates the pinion 3 for operating the rotary valve body 5 is supported between the upper spring 17 resting on the fixed part 14 of the housing of the device and the lower spring 28 which is operatively connected to the fixed part 11 of the housing by the movable working bellows 23 and the adjusting member 29, 30. In the illustrated position the rotary valve body 5 is positioned for flow of the heating medium from the pipe E into the pipe R, i.e., for example, for flow of hot water from a feed pipe E to a radiator. Now, if the fluid in the temperature feeler 21 expands due to an increase in ambient temperature, the increased pressure in chamber 25 causes the working bellows 23 to exert pressure on the spring 28 through the pin 24 whereby the tube 1 is urged upwards through the elements 29, 30. By this movement the rotary valve body 5 is rotated by the pinion 3 in a clockwise sense, so that the heating medium now flows into a water heater through the bypass pipe B.

This movement continues either until the force of the spring 17 equals that of the spring 28 which is under the influence of the working pressure exerted by the temperature feeler 21, or, in the case where the sum of the forces exerted by the working pressure and the spring 28 is greater than the force of the spring 17, until the tube 1 abuts against a sleeve 34 surrounding the spring 17. If the room temperature influencing the temperature feeler 21 becomes lower, the fluid in the temperature feeler 21 contracts and reduces the force exerted on the spring 28. The force of the spring 17 now predominates so that the tube 1 is moved downwards and the rotary valve body 5 is rotated in the counterclockwise sense whereby the hot water flows once again into the radiator through pipe R. In the position corresponding to full flow into the radiator through pipe R the tube 1 rests on the abutment formed by the ring 35. With a suitable design of the temperature feeler 21 and choice of thermal fluid the tube 1 actuating the rotary valve 5 can be adjusted to move within a small temperature range of for example ± 1°C. measured by the temperature feeler, between the two stops (sleeve 34, ring 35) and thereby causes the hot water to flow through the radiator and the bypass pipe B in relative amounts suitable for each of them so that the room temperature fluctuates only within said temperature range.

If another constant room temperature is desired, the adjusting knob 18 of the control valve is appropriately rotated. The threaded sleeve 30 is thereby also rotated and the total length of the adjusting member consisting of the threaded sleeve 30 and the threaded bolt 29 is varied. This causes, according to the direction of rotation of the adjusting knob 18, an increased compression or expansion of the spring 28. In the first case the force exceeds that of the spring 28 so that the tube 1 abuts against the upper stop (sleeve 34) and the rotary valve body 5 is rotated to connect the bypass pipe B. In the second case the force exceeds that of the spring 17 and urges the tube 1 onto the lower stop (ring 35) whereby the rotary valve body 5 is turned to connect the radiator pipe R. Regulation of the valve in dependence on small fluctuations of the temperature around the temperature feeler 21 is affected only if the room temperature has been so far adjusted by the effect of the rotary valve body 5 which is in one of the two limit positions, and has been so much changed that the tube 1 actuating the rotary valve 5 is maintained substantially in suspension between the springs 17 and 28. At this new working pressure of the temperature feeler 21 there is also an unchanged great accuracy of control, because, already at small fluctuations of the room temperature of, for example ± 1°C. and of the desired mean temperature, the amount of hot water flowing through the radiator is varied between the widest possible limits. The springs 17 and 28 represent an energy store, which receives variations of force acting on the actuating member (tube 1) of the rotary valve body 5 and caused by the room temperature which is adjustable to almost any desired extent, without reducing the accuracy of control.

A different mode of movement of the tube 1 relative to the movement of the control edge 6 of the valve 5 is desirable.

When the control valve and the hot water heating system are started the first time the pinion 3 is moved out of engagement with the rack portion 2 of the tube 1 by making use of the gear clutch 7 and the valve 5 is moved into middle position by manipulating the wheel 8. Thereafter the room is heated and after reaching steady conditions the room temperature is now set at the measured temperature in relation to a temperature scale provided on the stationary housing part 14 whereafter the pinion 3 is forced in engagement with the rack 2. The control valve is now ready for normal operation and indicates the room temperature on the aforesaid temperature scale.

The rotary valve body 5 shown in FIGS. 1 and 2 is constructed as a three-way cock. In order to obtain a progressive increase of the amount of water flowing to the pipe R, *i.e.* into a radiator, on rotation of the rotary valve 5 and in order to obtain a suitable dosage rate the slot or opening 6 in the rotary valve body 5 is of triangular shape. A flow area made in this way allows initially only very little water flow, which makes the control by the valve easier. The same effect can also be achieved by other means, for example by providing a suitable hole in the bushing which receives the rotary valve body 5. By the over lapping of the openings in the rotary valve and in the bushing a flow area can be obtained which makes possible a progressive increase of the rate of flow.

In order to prevent heat transmission from the control valve housing which is approximately at the temperature of the flowing heating medium to the working bellows and to the fluid of the temperature feeler which fluid surrounds the working bellows, an insulating element 12 made of synthetic material, and wherein the tube 1 slides, is arranged between the part 11 of the housing and the working bellows 23 and the tube 1. This prevents temperature differences caused by fluctuations of boiler temperature and consequent fluctuations in temperature of the heating medium affecting the working bellows and to reducing the accuracy of control.

In the embodiment shown in FIG. 1, a control bellows 46 is arranged within the temperature feeler 21. This control bellows serves to influence the working bellows 23 and therewith the valve 5. The control bellows 46 can be adjusted by means of a screw 47 whereby the working pressure transmitted to the working bellows 23 through a capillary tube 22 may be varied. This adjustability of the control range of the control valve is to advantage when the control valve is situated in an inaccessible position so that an adjustment of the temperature by means of the knob 18 is inconvenient or impossible. In addition, the control bellows 46 serves as a safety means, because when the fluid pressure is inadmissibly high, for example as the result of a direct intensive heating effect on the temperature feeler 21, the control bellows 46 is compressed whereby the pressure of the temperature feeler fluid is limited and bursting of the temperature feeler 21 or of the working bellows 23 is prevented.

A further safety measure against bursting of parts which are under pressure of the temperature feeler fluid, due to excessive heating of the temperature feeler is provided by suitably dimensioning the spring 28. If this spring has a sufficiently long stroke path, it can accommodate a larger expansion of the temperature feeler fluid, so that the pressure does not rise to a value which overstresses the parts under pressure.

Control valves according to the invention are used particularly in hotels, hospitals, spacious offices. It is therefore of advantage if in addition to the individual adjustment of the valves, a central control is provided. For example, in hospitals each room should be controllable from outside according to a time table without disturbance of the patient in the particular room. This can be achieved by providing the temperature feeler 21 with an electric heating coil 48 or cartridge heater. The heating coil 48 is supplied, for example, with low voltage current and permits artificial heating of the temperature feeler by a few degrees centigrade. The adjustable heating current is supplied from a central source. If in the particular room a lower temperature is desired either during the night or during absence of the patient the additional heating current of the respective temperature feeler can be reduced from the central location. The room temperature is thereby set to a lower value without entering the room or readjustment of the valve. Adjustment of the additional heating current can also be effected by a time switch, by means of which, for example, during the night or in absence of the occupant the room temperature is reduced.

If necessary, the control valve described can also be used as a hand valve without necessitating complete dismantling especially unscrewing of the inlet and outlet pipes. In this case the chamber 25 for the working bellows 23 is unscrewed from the part 11 of the housing of the valve control. At the same time, due to provision of the screw 32, the spring 28 and the adjustment element 29, 30 can be removed from tube 1. The position of the tube 1 which is under the pressure of the spring 17 and which operates the rotary valve 5 through the rack 2 and the pinion 3, is now determined only by the extent to which the threaded sleeve 15 is screwed onto the tube 1 (thread 16). By the rotation of the adjusting knob 18 the tube 1 may be moved longitudinally whereby the rotary valve body 5 may be adjusted between its two limit positions.

FIG. 3 shows the control valve according to FIG. 1 encased in a housing and shows a modification of the operating parts for the rotary valve and also a modification of the temperature feeler.

In a housing 37 which is illustrated in part section, and between the fixed parts 11 and 14 of the housing in the tube 1, which is provided with a toothed part 2 for actuation of a rotary valve (not visible) situated at the junction of the pipes E, R and B. The construction of the tube 1 corresponds to that illustrated in FIG. 1. The adjusting knob 18 and the upper compression spring 17 as well as the chamber 25 which is connected to the housing 37 by means of an insulating layer 12 made of a plastic and to which the capillary tube 22 is connected are as illustrated in FIG. 1. The toothed part 2 of the tube 1 actuates the pinion 3. In order to transmit the rotary movement to the shaft of the rotary valve additional gears may be provided. In the example shown in FIG. 3 additional gears 38, 39 and 40 are provided, the gear 38 being mounted on the same shaft as the pinion 3 and the gear 39 being fixed on the shaft of the rotary valve. An intermediate gear is designated by numeral 40. By appropriately choosing the diameters of these gears a desired transmission ratio between the rotary movements of the pinion 3 and the gear 39 of the rotary valve may be achieved.

The hand wheel 8 mounted on the shaft of the rotary valve is provided with an indicator disc 9 for indicating the position of the rotary valve. By pressing an outwardly projecting knob 41 the intermediate gear 40 can be disconnected so that the position of the rotary valve body 5 can be manually adjusted by manipulation of the hand wheel 8, which is necessary for the initial setting of the control valve.

In the illustrated embodiments the temperature feeler 21 is arranged in a housing having external cooling ribs or fins 42 which also serve as a means for mounting the temperature feeler 21 in a baseplate 43.

The control valve described can also be used as a mixing valve for the mixing of hot and cold water. For this purpose the pipe B serves as a cold water supply. The hot water flows through the pipe R into the valve, whilst the water mixture flows out through the pipe E. The temperature feeler which produces the working pressure required for maintaining the temperature of the water mixture, is in thermal contact with the water mixture pipe E.

I claim:

1. In a regulating valve having a rotary valve for controlling a flow of heating medium and an axially movable tube for actuating said rotary valve:

a first stationary support;

a first compression spring abutting said support at one end and said tube at the opposite end;

a temperature feeler responsive to the temperature of the ambient air;

a second stationary support;

a temperature responsive means including a bellows fixedly mounted at one end to said second stationary support and a piston secured to said bellows at the opposite end thereof, said temperature feeler being connected to said temperature responsive means to move said piston relative to said tube in response to a change in ambient air temperature; and a second spring of higher elasticity constant from said first spring on the opposite side of said tube abutting said piston and said tube at opposite ends thereof for transmitting the movement of said piston to said tube in response to a change in ambient air temperature, said first and second springs supporting said tube in a floating position for a desired working pressure of said temperature feeler.

2. In a regulating valve as set forth in claim 1 an adjusting member of adjustable length mounted at one end on said second spring and abutting said tube at the opposite end for varying the force exerted by said second spring to vary the response of said tube to different temperatures measured by said temperature feeler.

3. In a regulating valve as set forth in claim 1 which further includes an adjusting member of adjustable length within said tube, said member abutting against said second spring and said second spring being disposed within said tube.

4. In a regulating valve as set forth in claim 3 wherein said adjusting member includes a threaded bolt having a rotatable sleeve mounted thereon.

5. In a regulating valve as set forth in claim 1 further comprising a housing mounting said tube therein, said tube having a rack disposed thereon within said housing.

6. In a regulating valve as set forth in claim 1 which further comprises a housing about said tube, an adjusting member of adjustable length in said tube connected to said second spring, and a plastic intermediate layer between said bellows and said housing for avoiding heat transfer from said housing to said bellows.

7. In a regulating valve as set forth in claim 1 wherein said tube includes a rack and said rotary valve includes a pinion in meshing engagement with said rack.

8. In a regulating valve as set forth in claim 7 which further comprises a gear-type clutch connecting said pinion to said rack, a hand wheel for turning said pinion and an indicator disc for indicating the position of said pinion.

9. In a regulating valve as set forth in claim 7 which further comprises at least one gear between said rack and said pinion to effect a transmission ratio between the rotary movement of said pinion and said gear.

10. In a regulating valve as set forth in claim 7 wherein said tube includes a threaded sleeve rotatably mounted thereon and supporting said first spring thereon.